June 5, 1945. F. O. LUENBERGER ET AL 2,377,563
MOTOR ADJUSTING MECHANISM
Filed March 9, 1943 3 Sheets-Sheet 2

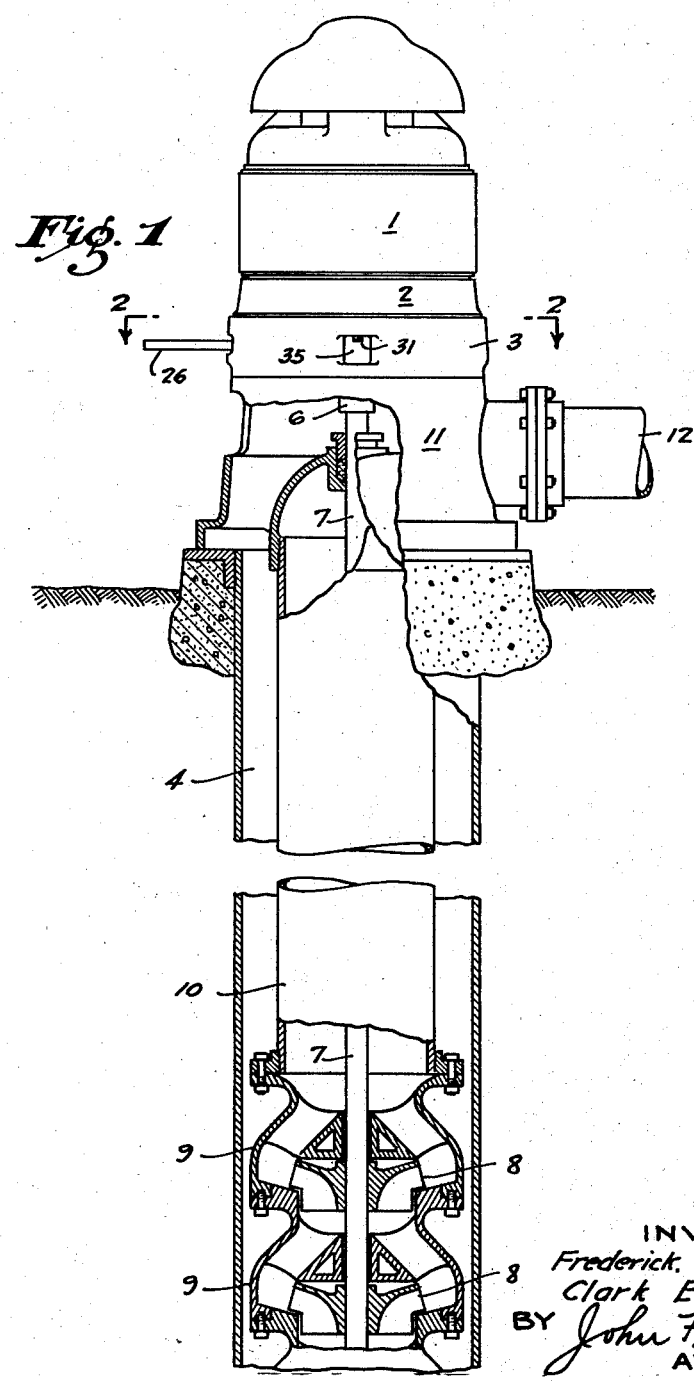

INVENTORS
Frederick O. Luenberger
Clark E. Pugh
BY John Flam
ATTORNEY

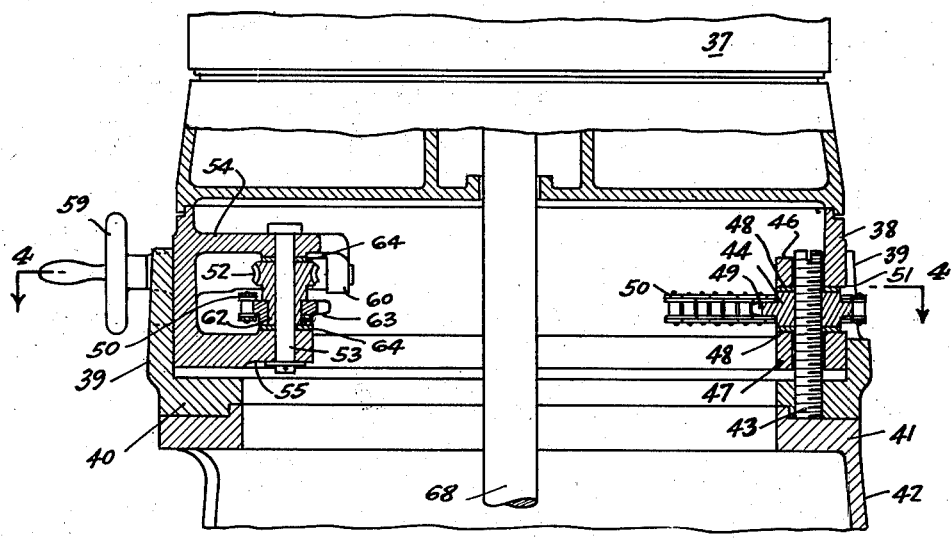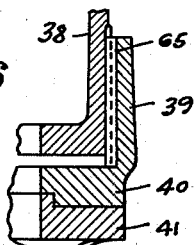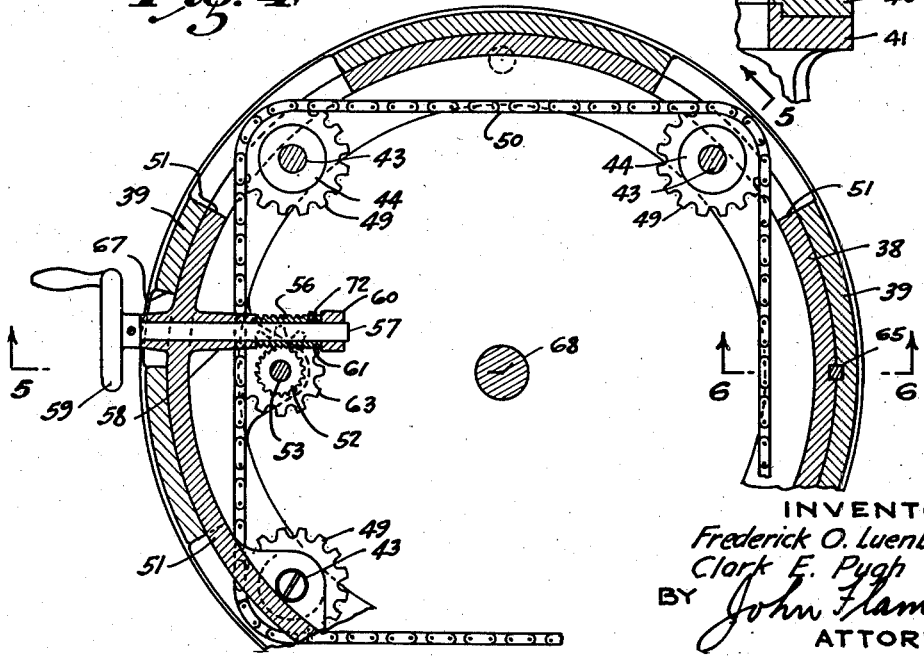

Patented June 5, 1945

2,377,563

UNITED STATES PATENT OFFICE 2,377,563

MOTOR ADJUSTING MECHANISM

Frederick O. Luenberger, Los Angeles, and Clark E. Pugh, Inglewood, Calif., assignors to U. S. Electrical Motors, Inc., Los Angeles, Calif., a corporation of California Application March 9, 1943, Serial No. 478,564

6 Claims. (Cl. 248—23)

This invention relates to motors, and more particularly to motors adapted to operate pump impellers.

Installations of this character are quite common for deep well pumps, in which the motor is disposed at the top of the well. The motor shaft is in vertical alinement with the pump shaft, and these shafts are appropriately coupled.

The rotary pump impellers operated by the motor co-operate with the stationary parts of the pump to move the liquid out of the well. The relative axial positions of the impellers and the pump stator parts must be carefully determined to ensure that the impellers co-operate most effectively with the stationary pump parts. Even a slight deviation from optimum relative positions is apt to result in a very material loss in efficiency, or even in actual interference between the rotary and stationary parts of the pump.

While the necessity of making accurate adjustments of the axial positions of the impellers has been recognized in the past, it was quite inconvenient to make such adjustments; and, often, the adjustments could be made only at a standstill. Upon running the pump, the necessity of further adjustment often occurred, and the entire process of obtaining the best position of the impellers would be quite tedious.

It is one of the objects of this invention to make it possible to adjust the position of the impellers while the motor is in operation; in this way, the optimum position can be readily obtained.

It is another object of this invention to provide a simple and reliable adjusting mechanism of this character.

It is another object of this invention to provide an adjusting mechanism for moving the motor in an axial direction while it is running, the adjusting mechanism being simple and reliable in operation.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, partly in section, of a pump and the driving motor, in which the invention is embodied;

Fig. 4 is a view similar to Fig. 2 of a modified form of the invention, and taken generally along the plane 4—4 of Fig. 5;

Fig. 5 is a fragmentary sectional view, taken along plane 5—5 of Fig. 4; and

Fig. 6 is a detailed sectional view, taken along plane 6—6 of Fig. 4.

Figure 3:
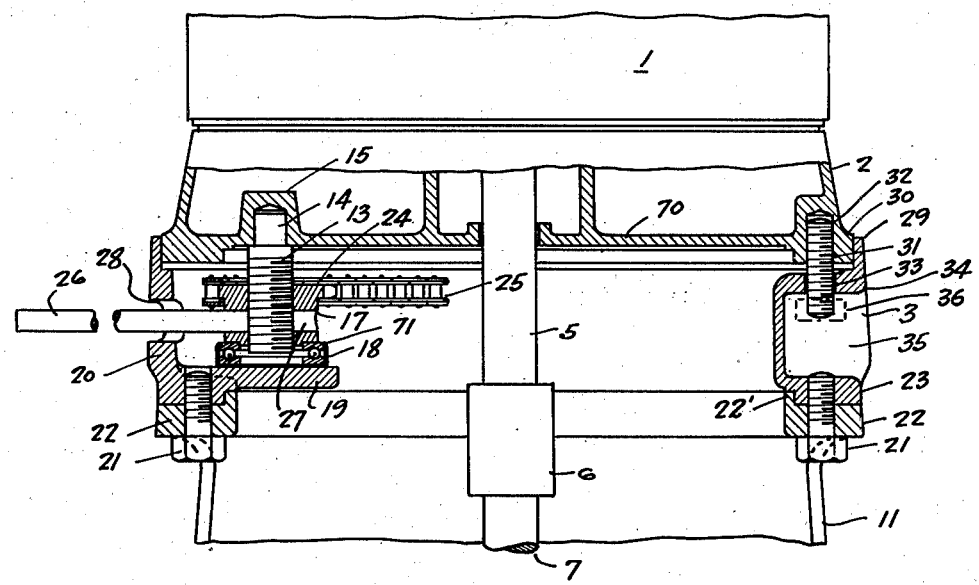
Fig. 3 is a fragmentary sectional view, taken along the plane 3—3 of Fig. 2.

In the present instance, a vertical electric motor 1 (Figs. 1, 2 and 3) is illustrated. Motor 1 is shown as mounted upon, and attached to, a lower bracket or frame 2. This lower bracket 2 in turn is shown as supported upon a base 3 that is disposed at the top of a well 4 (Fig. 1).

The motor shaft 5 is coupled as by an appropriate coupling 6 to a pump shaft 7. This pump shaft 7, as shown most clearly in Fig. 1, extends downwardly into the well 4 and carries one or more impellers or runners 8. These impellers co-operate with the pump casings 9 in the usual manner to force liquid upwardly through the vertical discharge pipe 10. This vertical pipe 10 is shown as leading into the pump head 11, whence the liquid passes to the discharge pipe 12.

The particular design of the pump structure and of the motor 1 may be conventional, as the invention is not concerned with such details. Accordingly, a diagrammatic representation of the pump parts is sufficient, the supporting bearings, etc., being omitted.

The axial position of the runner or impeller 8, with respect to its co-operating pump casing 9, is quite critical. Ordinarily the impellers operate with only minor clearances within the pump. It is essential, therefore, to provide means for raising or lowering the impellers 8 to bring them into substantially exact register with the corresponding stationary parts of the pump structure.

In the present instance the raising and lowering of the impellers 8 is accomplished by raising or lowering the electric motor 1 with respect to the supporting base 3. The structure whereby this is effected can be explained most readily in connection with Figs. 2 and 3.

A plurality of screws 13 (three in this instance) is arranged so that the axes of the screws are parallel with the axis of the shaft 5, and are equiangularly disposed around the shaft axis. These screws 13 are rigidly attached to the lower portion of the bracket or frame 2 that carries the stationary parts of the motor 1. For example, these screws 13 may be provided with a reduced cylindrical portion 14 fitted into corresponding recesses formed in bosses 15 integral with the lower flange 70 of the frame or bracket 2.

Screws 13 co-operate respectively with nuts 16, 17, etc., that, as explained hereinafter, are restrained against axial movement. Upon rotation of these nuts, the electric motor 1 is raised or lowered with respect to the support upon which the nuts 16, 17, etc., are supported.

In the present instance, each of these nuts is shown as provided with an anti-friction step bearing structure 18, the lower race of which rests upon a co-operating bracket 19 formed integrally with the base 3 and extending inwardly of the substantially vertical wall 20 of the base. The upper race 71 telescopes over a shallow shoulder formed on the lower surface of the nut. The weight of the motor 1, with its associated parts, maintains the nuts 16, 17, etc., in fixed axial position on top of the bearing structures 18.

Base 3 is shown as securely attached to the pump head 11 as by the aid of the cap screws 21. These cap screws pass through the top flange 22 of the head 11. The base 3 is shown as provided with a lower flange 23 that telescopes over the cylindrical extension 22' projecting upwardly from the flange 22.

The manner in which all of the nuts 16, 17, etc., are simultaneously operated will now be described. Nuts 16 and 17 have flanges at their upper ends which take the form of sprocket wheels 24. A sprocket chain 25 is arranged to engage all of the sprocket wheels 24. Accordingly, operation of the sprocket chain 25 causes simultaneous and equal operation of all of the nuts 16, 17, etc. This simultaneous operation may be accomplished as by the aid of a bar 26, forming a turning tool for one of the nuts, such as 17. This bar is arranged to be inserted into any one of a number of radial recesses 27 formed in the nuts 17. The bar 26 is shown as extending through the slot 28 formed in the upright wall 20 of the base 3. Manual operation of the nut 17 by successive engagement and disengagement of the turning tool 26 in successive recesses 27 in readily accomplished, the slot 28 being wide enough to permit a substantial angular movement of the bar 26 before it is required to remove and replace the bar in a succeeding recess 27. Furthermore, the bar 26 may be long enough to provide adequate leverage for manual operation from the exterior of the base 3.

The base 3 is further shown as provided with a vertical flange 29 which guides a cylindrical lower portion 30 of the frame 2.

In order to prevent turning of the stator of motor 1 about its own axis when the wheels 24 are operated, a restraint is placed against angular movement of the motor frame 2 with respect to the base 3. For this purpose one or more pins 31 are provided, having axes substantially parallel with the axis of the shaft 1 and equiangularly spaced about the motor shaft axis. In this instance, two such pins at diametrically opposite points are used. These pins, which are shown most clearly in Fig. 3, may be permanently attached to base 2, as by being threaded into the threaded sockets 32. Pins 31 extend downwardly and through the clearance apertures 33 formed in the top wall 34 of the recesses 35 defined in the base 3.

These recesses 35 are provided to make it possible to gain access to the lower ends of the pins 31 from the exterior of the base 3. For the purpose of maintaining the base 3 and motor 1 in proper assembled relationship during shipment, the pins 31 may be threaded at their lower extremity for the accommodation of nuts 36. These nuts may optionally be utilized to maintain the frame 2 of the motor 1 in tight relationship with the base 3. However, after the motor 1 is installed, the nuts 36 are removed, and the cooperation of the pins 31 with the clearance apertures 33 restrains the motor structure against angular movement.

The simultaneous operation of the nuts 16, 17, etc., by manipulation of the turning tool 26 can be accomplished when the motor 1 is operating. Furthermore, the adjustment of the vertical position of the motor 1 can be provided in increments as small as desired, accurately to determine the positions of the impellers 8 within the pump casings 9. By providing co-operating nut and screw members substantially equi-angularly disposed around the axes of the motor 1, it is ensured that the motor 1 can be moved in a true axial direction.

In the form of the invention illustrated in Figs. 5, 6, and 7, the motor 37 is shown as attached, as before, to a frame or bracket 38 that, in turn, is slidable within the upright wall 39 of a base 40. This base 40 is fastened to the upper flange 41 of a pump housing 42.

A number of upright equi-angularly spaced screws 43 are securely fastened into the horizontal flange of the base 40. These screws 43 are arranged to co-operate with nuts 44 that are restrained against axial movement with respect to the base 40. Consequently, simultaneous rotation of the nuts 44 produces a corresponding vertical movement of the frame 38 and the motor 37 supported on the frame.

For this purpose, the nuts 44 are shown as disposed between the ears 46 and 47 projecting inwardly from the wall of frame 38. Interposed between the opposed surfaces of the nut 44 and these ears are appropriate bearing washers 48. The screw 43 passes through appropriate clearance apertures in these ears 46 and 47.

For simultaneously operating the nuts 44, each of these nuts is provided with sprocket teeth 49, and there is provided a common sprocket chain 50 that engages the teeth 49 upon all of the nuts 44. Since the sprocket teeth extend radially considerably beyond the wall of frame 38, the frame is provided with slots 51 (Fig. 4) opposite these nuts 44. Thus, there is no interference to the rotation of the nuts; and sprocket chain 50 and nuts 44 can pass through the slots 51.

In the present instance, operation of the sprocket chain 50 for simultaneous operation of the nuts 44 is accomplished by a worm and wheel mechanism, rotating a driving sprocket wheel. Thus, a worm wheel 52 is shown as rotatably mounted upon a stationary vertical shaft 53. This shaft 53 is supported in the arm 54 shown integrally formed with the frame 38. The lower portion of the shaft 53 is supported in an ear 55, also integrally formed with the frame 38. The worm wheel 52 is shown as operated by a worm 56 (Fig. 4) which is secured to a worm shaft 57. This worm shaft 57 is rotatably supported in the boss 58 formed integrally with the frame 38. The wall 39 may be provided with an appropriate recess 67 (Fig. 4) to accommodate the left hand portion of the boss 58. The left hand extremity of the shaft 57 carries a hand wheel 59 for manual operation of the worm 56. The right hand extremity of the shaft 57 is supported in an ear 60 formed integrally with the arm 54. The worm 56 may be appropriately fastened to the shaft 57 in any desired manner. For example, a collar 61, joined to the worm 56, can be fastened as by a set screw 72 to the shaft 57.

The worm wheel 52 is provided with a hub 62 upon which is rigidly mounted a sprocket wheel 63. This sprocket wheel 63 is in operative engagement with the sprocket chain 50. Bearing washers 64 may be interposed between the assembled sprocket wheel 63 and worm wheel 52, and the co-operating surfaces of the arm 54 and of the ear 55.

Upon rotation of hand wheel 59, the sprocket wheel 63 is correspondingly rotated, and the sprocket chain 50 is moved for simultaneous rotation of all of the nuts 44. The frame 38, with the nuts 44 and operating mechanism including the sprocket 50, is raised and lowered in accordance with the co-operative movements of the nuts 44 with respect to the stationary screws 43.

In this form of the invention, the restraint against angular movement of the motor 37 is accomplished by the aid of a slot and key mechanism, illustrated most clearly in Figs. 4 and 6. A key 65 is engaged in the slots formed respectively in the frame 38 and in the vertical wall 39 of the base 40.

Figure 2:
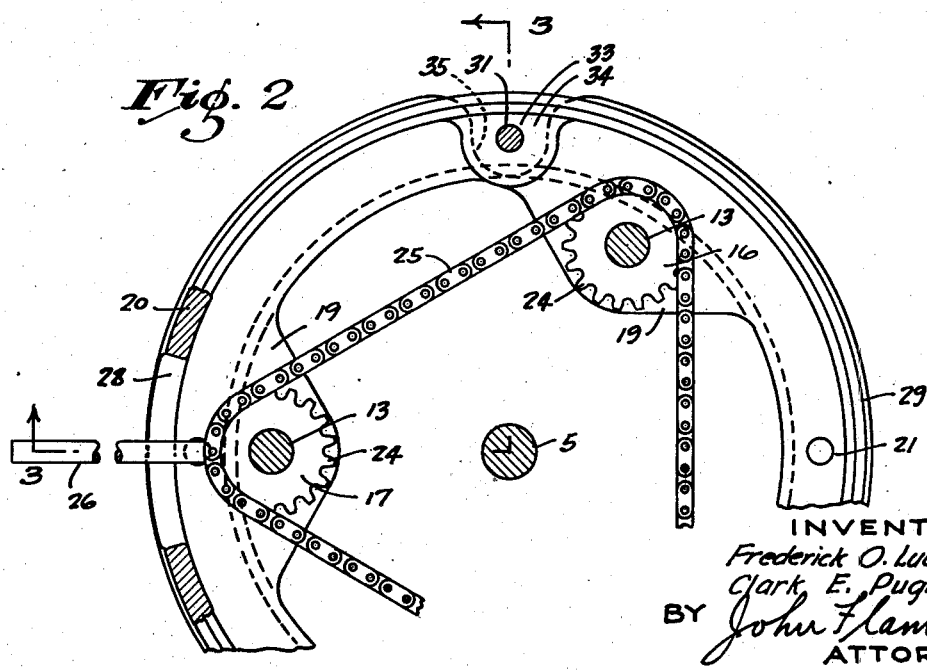
Fig. 2 is a fragmentary sectional view somewhat enlarged, taken along the plane 2—2 of Fig. 1.

As in the first form shown in Figs. 1, 2, and 3, the increments of adjustment of the motor 37 with its shaft 68 may be made as fine as desired. By appropriate manipulation of the hand wheel 59, the frame 38 is caused to move in an axial direction.

What is claimed is:

1. In a device for adjusting the vertical position of a vertical electric motor having a shaft coupled to a load for supporting said load and for rotating said load about the motor axis, said load having an optimum vertical position, said motor having a lower bracket through which the shaft extends downwardly, a supporting base below the bracket, sets of threadedly engaged members having axes parallel to the axis of the motor shaft and spaced around that axis, one member of each set being restrained against axial motion to cause the other member to move axially when the rotatable member of the set is rotated, means whereby such rotation operates upon the lower bracket to adjust the axial position of the motor, and a common means for rotating all of the rotatable members of the sets.

2. In a device for adjusting the vertical position of a vertical electric motor having a shaft coupled to a load for supporting said load and for rotating said load about the motor axis, said load having an optimum vertical position, said motor having a lower bracket through which the shaft extends downwardly, a supporting base below the bracket, sets of threadedly engaged members having axes parallel to the axis of the motor shaft and spaced around that axis, one member of each set being restrained against axial motion to cause the other member to move axially when the rotatable member of the set is rotated, means whereby such rotation operates upon the lower bracket to adjust the axial position of the motor, a common means for rotating all of the rotatable members of the sets, and means for restraining said bracket to movement in an axial direction only, as the rotatable members are rotated.

3. In a device for adjusting the vertical position of a vertical electric motor having a shaft coupled to a load for supporting said load and for rotating said load about the motor axis, said load having an optimum vertical position, said motor having a lower bracket through which the shaft extends downwardly, a supporting base below the bracket, sets of threadedly engaged members having axes parallel to the axis of the motor shaft and spaced around that axis, one member of each set being restrained against axial motion to cause the other member to move axially when the rotatable member of the set is rotated, means whereby such rotation operates upon the lower bracket to adjust the axial position of the motor, a common means for rotating all of the rotatable members of the sets, means for restraining said bracket to movement in an axial direction only, as the rotatable members are rotated, comprising one or more pins forming guides between the supporting base and said bracket, and fastening means capable of co-operating with said pins for optionally preventing relative movement of the bracket and the base axially of the motor.

4. In a device for adjusting the vertical position of a vertical electric motor having a shaft coupled to a load for supporting said load and for rotating said load about the motor axis, said load having an optimum vertical position, said motor having a lower bracket through which the shaft extends downwardly, a supporting base below the bracket, a plurality of threaded members rotatably supported on said base, having axes parallel to the axis of the motor shaft and spaced around that axis, threaded supporting elements secured in said bracket and cooperating respectively with said members to support the bracket and the motor, and common means for rotating all of said rotatably supported members to adjust the axial position of the motor.

5. In a device for adjusting the vertical position of a vertical electric motor having a shaft coupled to a load for supporting said load and for rotating said load about the motor axis, said load having an optimum vertical position, said motor having a lower bracket through which the shaft extends downward, a supporting base below the bracket, sets of threadedly engaged members having axes parallel to the axis of the motor shaft and spaced around that axis, each of said sets including a member rotatably supported and laterally unrestrained on the base, a threaded rod engaging said member and fixed in said bracket, said rod serving to position the member laterally, common means for rotating all of said rotatably supported members to adjust the axial position of the motor, and means for restraining said bracket to move in an axial direction as the rotatable members are rotated.

6. In a device for adjusting the vertical position of a vertical electric motor having a shaft coupled to a load for supporting said load and for rotating said load about the motor axis, said load having an optimum vertical position, said motor having a lower bracket through which the shaft extends downwardly, a supporting base below the bracket, a plurality of threaded elements secured to said base, having axes parallel to the axis of the motor shaft and spaced around that axis, threaded members rotatably mounted on said bracket and cooperating respectively with said elements and the bracket to support the motor, and common means for rotating all of said rotatably mounted members to adjust the axial position of the motor.

FREDERICK O. LUENBERGER.
CLARK E. PUGH.